United States Patent [19]

Stooksberry et al.

[11] 3,796,254

[45] Mar. 12, 1974

[54] TEMPERATURE CONTROL CONDUCTIVE DEVICE

[75] Inventors: Franklin D. Stooksberry, Stanton; Frank H. Schneider, Los Angeles, both of Calif.

[73] Assignee: The United States of America as represented by the Secretary of the Army, Washington, D.C.

[22] Filed: May 25, 1972

[21] Appl. No.: 257,996

[52] U.S. Cl. .................................. 165/47, 165/80
[51] Int. Cl. ............................................ F24h 3/00
[58] Field of Search ............... 165/47, 80, 185, 186

[56] References Cited
UNITED STATES PATENTS
3,215,194  11/1965  Sununu et al. ..................... 165/80

*Primary Examiner*—Charles Sukalo
*Attorney, Agent, or Firm*—Lawrence A. Neureither; Leonard Flank; Charles R. Carter

[57] ABSTRACT

A passive temperature conductive device for use in mounting flight control units in a missile. The device controls conduction of heat to provide maximum conduction during pre-launch operation from the units and minimum conduction to the units at high altitude flights. The mating surfaces of a conductive joint allows heat to flow freely from the units to the missile skin during pre-launch operation, but restricts the reverse flow of aerodynamic heating into the units during flight.

3 Claims, 2 Drawing Figures

PATENTED MAR 12 1974 3,796,254

TEMPERATURE CONTROL CONDUCTIVE DEVICE

BACKGROUND OF THE INVENTION

This invention relates to the field of temperature control devices. Missile flight control units are subjected to severe thermal environment during pre-launch operations which result in heat dissipation problems. In addition these units must be capable of sustaining the aerodynamic heating induced during flight. Present designs rely on the addition of mass to provide the required heat sink for ground operations and ducts for cooling air circulation and dissipation of the heat during missile flight.

SUMMARY OF THE INVENTION

The present invention has provided a solution to the above problem by supporting the missile flight control units on a unique temperature control conductive device. This device governs the heat dissipation from the units to the missile skin during pre-launch operations and restricts the reverse flow of aerodynamic heating into the unit during missile flight.

This invention may be better understood from the following detailed description taken in conjunction with the accompanying drawings.

DESCRIPTION OF THE PREFERRED EMBODIMENT

Figure 1:
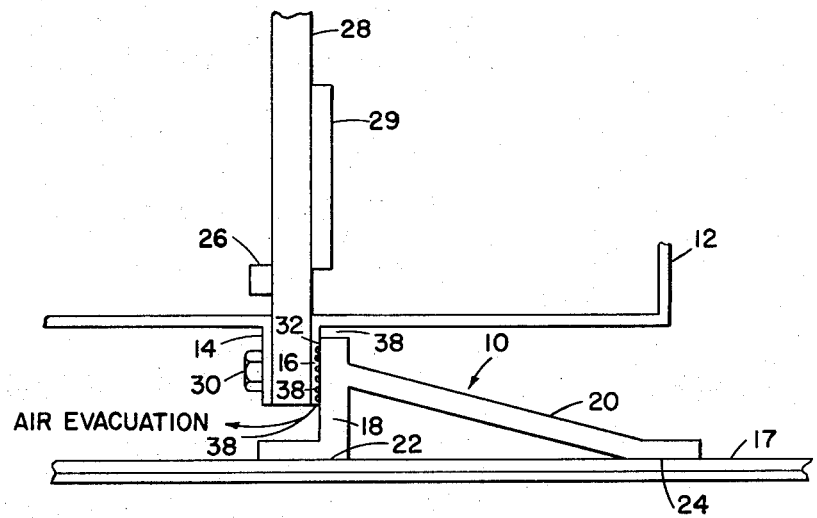
FIG. 1 shows the temperature control device used in mounting flight control units.

Reference numeral 10 generally indicates a heat conducting device for supporting a flight control unit 12 by flanges 14 and 16 in a missile 17. The device includes diverging legs 18 and 20 connected to the missile at points 22 and 24. A resistor 26, used for pre-launch testing to provide heat which is representative of the heat normally produced by internal electrical components 29, is mounted on a plate 28. This plate serves to remove heat from the inside of unit 12. A bolt 30 connects flanges 14 and 16 and the external portion of plate 28 to the device 10. A conductive joint 32 is located at the point where the mating surfaces of flange 16 and leg 18 meet. The finishing of the mating surfaces at the conductive joint combined with the bolt torque used in securing the elements together provide a unique structure for predetermining dissipation of heat during pre-launch testing and flight of the missile. Variation in either surface finish or bolt torque will vary dissipation of the heat capability of the invention.

Figure 2:
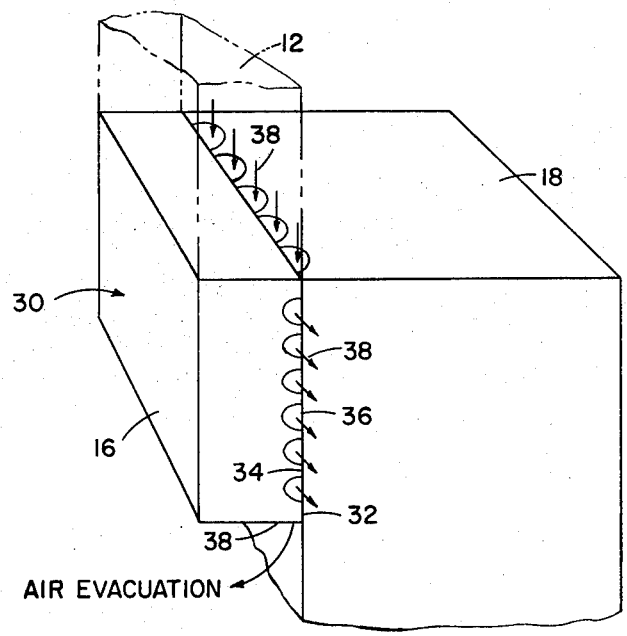
FIG. 2 shows a close up view of the mating surfaces of the conductive joint.

FIG. 2 shows an enlarged view of the mating surfaces of flange 16 and leg 18 at the conductive joint 32. Reference numeral 34 identifies the mating surface of flange 16 which is end mill finished to a roughness of $\sqrt{63}$ and then anodized. Reference numeral 36 indicates the corresponding mating surface of leg 18 which is lathe finished to a roughness of $\sqrt{63}$ and then anodized. The tool marks of both surfaces, when mated as shown, intersect at 45° or more and minimizes solid-to-solid conduction due to a space left by the tool marks on the surfaces. Reference numeral 30' schematically identifies the clamping pressure applied to the mating surfaces by the torque of bolt 30.

During pre-flight operation, heat from the flight control unit 12 is conducted through plate 28 and joint 32 to the missile at points 22 and 24. These points are separated enough to provide added heat sink capability along with adequate structural support.

When the missile is launched it will contain internal trapped air at sea level pressure. In flight, the missile passes from an outside sea level pressure to a decaying outside air pressure. Since a missile is not completely air tight the trapped air, at sea level pressure, will bleed through the missile skin tending to equalize with the outside air pressure. As air leaves the missile, the inside of the missile is evacuated to a vacuum condition.

This produces a vacuum condition in the voids between the mating surfaces 34 and 36 which will reduce the thermal conductivity between the surfaces during flight. This technique prevents possible interstitial fluid conduction for points not in physical contact. A reduction in the joint thermal conduction by a factor as much as 3 will occur during flight due to this technique.

The bolt torque which applys the clamping pressure to the mating surfaces is a predominant factor in the heat conduction. Hence the bolt torque is based on the minimum value to ensure structural integrity.

We claim:

1. A temperature control device for use in a missile to provide maximum heat conduction during pre-launch operation and minimum heat conduction at high altitudes, said device comprising: a flight control unit having a plate for mounting heat producing electrical components contained in said flight control unit, said plate provided with a portion extending outside of said unit, said unit having an intergal flange with one surface juxtaposed to said plate, and a machined surface opposite said plate; a heat conducting device having a pair of divergently connected legs, one of said legs having a machined surface for mating with said surface on said flange; both of said surfaces having tool marks disposed to intersect at an angle of at least 45° relative to each other for minimizing surface contact, and bolt means for applying a predetermined clamping pressure on said mating surfaces.

2. A device as set forth in claim 1 wherein one of said mating surfaces has a lathe finish and the other surface has an end mill finish, both surfaces having a roughness of approximately $\sqrt{63}$ and are anodized.

3. A device as set forth in claim 1 wherein said angle of intersection of said surfaces is greater than 45°.

* * * * *